United States Patent [19]
Beaulieu et al.

[11] 3,725,735
[45] Apr. 3, 1973

[54] TRANSVERSE ELECTRODE EXCITATION OF A MOLECULAR GAS LASER

[75] Inventors: Alexandre J. Beaulieu, Ste. Foy; Roger Fortin, Courcelette, Quebec; Derwyn C. Johnson, Ottawa; Alexander Robinson, Sillery, Quebec, all of Canada

[73] Assignee: Her Majesty the Queen in right of Canada as represented by the Minister of National Defence of Her Majesty's Canadian Government

[22] Filed: Aug. 20, 1970

[21] Appl. No.: 65,476

[30] Foreign Application Priority Data

Aug. 29, 1969 Canada....................................60,718

[52] U.S. Cl. ..................315/249, 313/351, 331/94.5
[51] Int. Cl............................H01s 3/22, H05b 41/14
[58] Field of Search ......313/351; 331/94.5; 315/249; 330/43

[56] References Cited

UNITED STATES PATENTS 3,464,025  8/1969  Bell.....................................331/94.5
3,427,567  2/1969  Bridges et al.........................331/94.5
3,577,096  5/1971  Bridges.................................331/94.5
3,543,179  11/1970  Wilson.............................331/94.5 X
3,402,313  9/1968  Gabor et al.......................313/351 X

*Primary Examiner*—Palmer C. Demeo
*Attorney*—Cushman, Darby & Cushman

[57] ABSTRACT

A transverse excitation system for a molecular gas laser is disclosed in which a pair of electrodes supplied with high voltage DC pulses are provided, the electrodes being shaped to cause an electric discharge therebetween which has a predetermined geometric distribution such that the gain characteristic and the refractive index characteristic of the laser is a spatial distribution to preferentially excite a predetermined resonant cavity mode in the laser gas. Two specific examples of such an electrode structure as a helical electrode structure and a planar electrode structure in which a plurality of rows of pin electrodes are provided, the rows being skewed at an angle with respect to the longitudinal axis of the laser.

3 Claims, 5 Drawing Figures

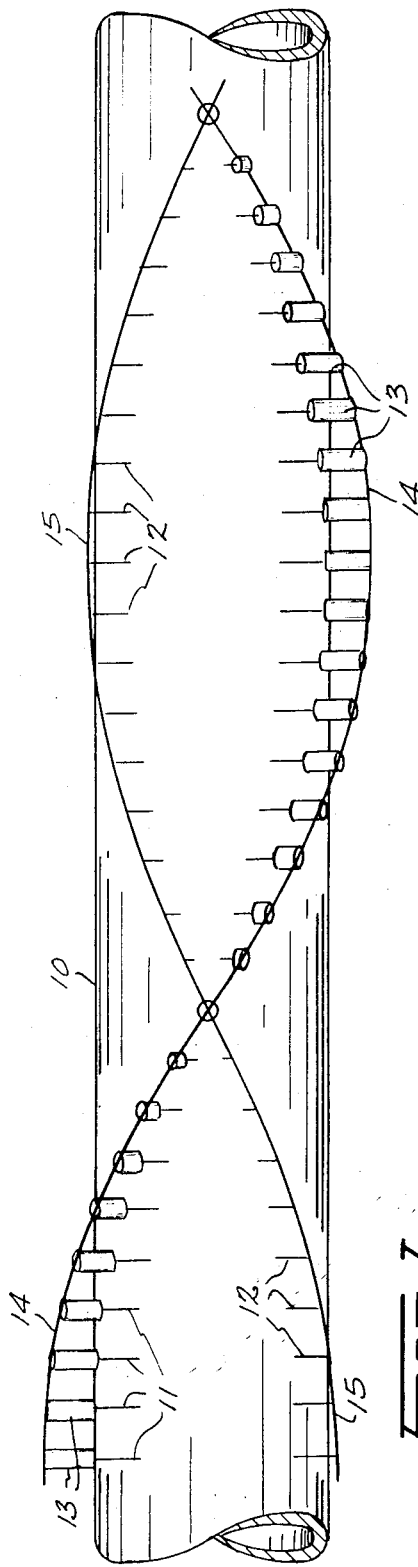
Fig. 1.
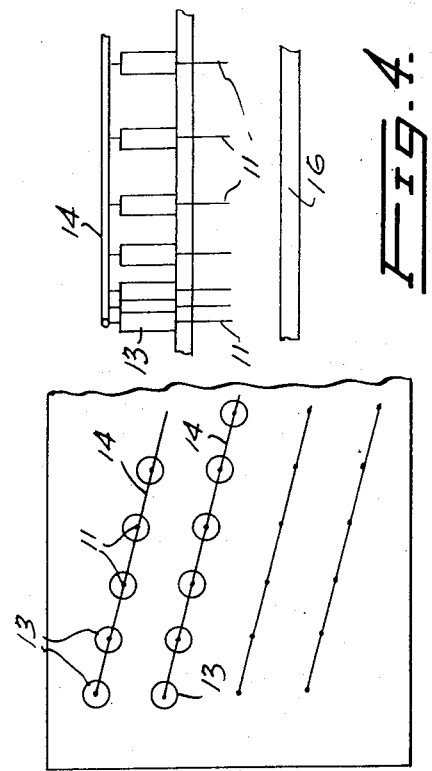
Fig. 3.
Fig. 4.
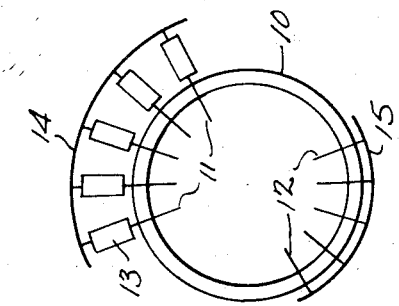
Fig. 2.

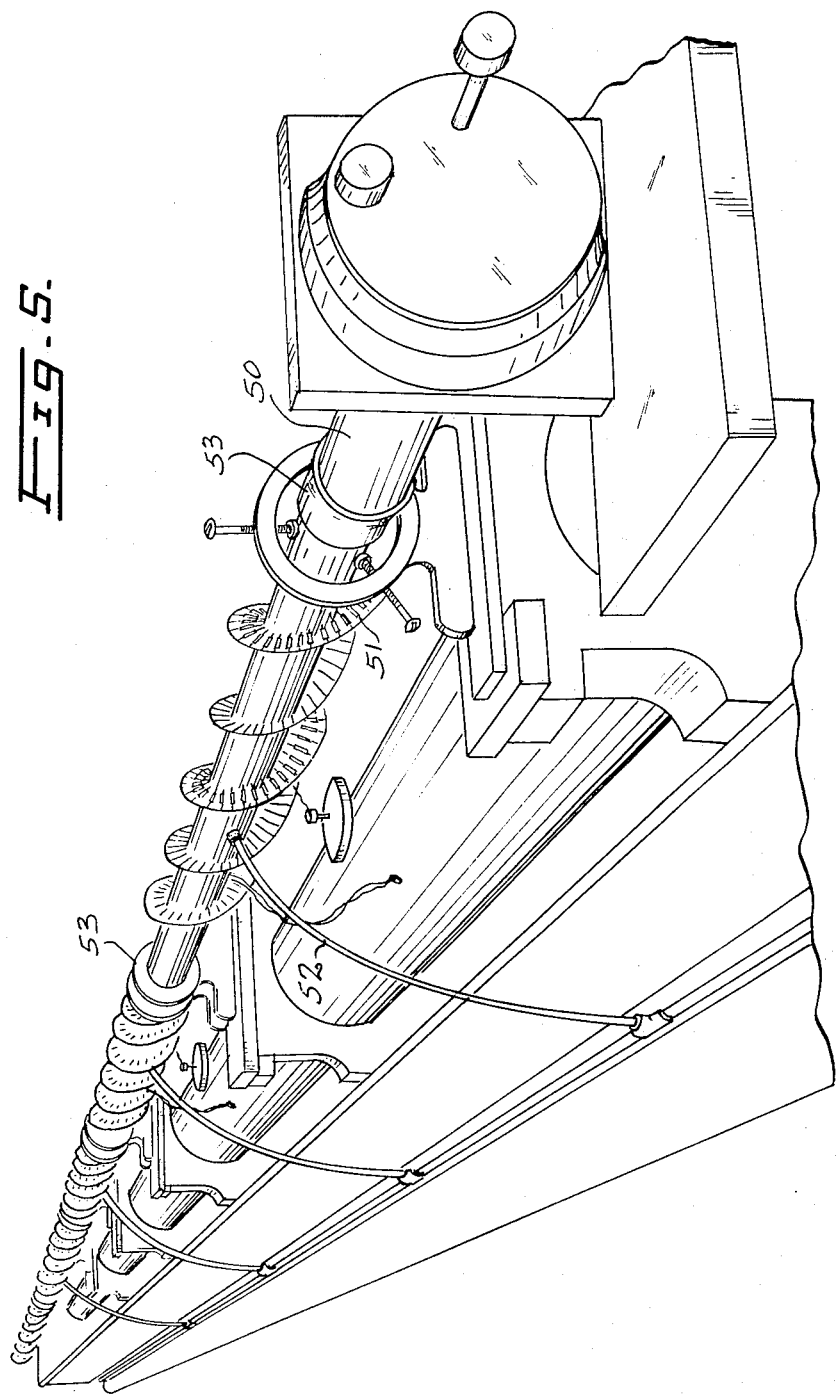

TRANSVERSE ELECTRODE EXCITATION OF A MOLECULAR GAS LASER

The present invention relates to the field of molecular gas lasers and in particular to electrode structures for transversely exciting a molecular gas laser.

In U.S. application Ser. No. 731,693, filed May 21, 1968, in the name of Jacques Beaulieu, there is disclosed apparatus for exciting or "pumping" a molecular laser gas contained within a laser cavity. In general this method consists of initiating a transverse arc or electric discharge between longitudinally extending electrode structures whereby the desired population inversions are generated in the energy levels of the gas to cause laser operation.

The present invention constitutes an improvement in the excitation structures disclosed in the prior application wherein the various resonant cavity modes of the laser may be preferentially excited. In accordance with the invention the electrode structure is shaped to provide a predetermined geometric distribution of the transverse discharge and thus the resonant cavity mode of the laser is preferentially excited due to the geometric distribution of the discharge.

Each discharge path gives rise to a column where the molecules are excited giving gain in this column, but also because of the heating of the gas in the discharge column the refractive index of this column would be lower than that of the surrounding gas which gives rise to scattering of the laser radiation. When considering a large number of such discharges, it seems sufficient to consider the average value of the gain or refractive index coefficients as each discharge has a very small effect which becomes important only when large numbers are considered.

By varying the geometric distribution of the discharge along the laser, the gain and refractive index characteristics of the laser are caused to have a spatial distribution which reinforces the generation of laser energy in a predetermined resonant cavity mode in preference to any other modes.

In the accompanying drawings which illustrate embodiments of the present invention:

FIG. 1 is a plan view of an electrode structure in accordance to the present invention having a helical configuration, FIG. 2 is an end view of the electrode structure of FIG. 1, FIG. 3 is an alternative embodiment of the invention, FIG. 4 is an end view of the electrode structure of FIG. 3, and FIG. 5 is a perspective view of an operating structure.

Referring to FIGS. 1 and 2 there is shown a portion of a molecular gas laser comprising a cylindrical insulating tube 10 provided with a helical electrode structure and consisting of pairs of discharge points 11 and 12 diametrically opposing one another across the tube 10. All of the points 11 are arranged in a helix along the tube 10; similarly all the points 12 are arranged in a diametrically opposed helix facing the electrodes 11. Associated with each of the electrodes 11 is a stabilizing resistance 13 for arc stabilization purposes as discussed in the above referred prior application. The free terminal of each of the resistors 13 is connected to a high voltage line 14 which is connected in circuit with a high voltage pulser as described in the prior application. Similarly each of the electrodes 12 is connected to a line 15 which is also connected to the pulser. High voltage pulses are supplied between the lines 14 and 15 causing a transverse discharge between the pair of electrodes 11 and 12 to excite the laser gas in cavity 10. The helical structure illustrated in FIG. 1 is shown in end view in FIG. 2 which serves to show the angular displacement of each pair of electrodes 11 and 12 from the preceeding pair of electrodes 11 and 12.

The helical structure illustrated in FIGS. 1 and 2 has a symmetry of revolution which results in the excitation energy being concentrated in the center of the laser cavity and this concentration in the center of the cavity preferentially selects the low order, even symmetry transverse modes in the laser cavity. By controlling the angle between successive pairs of electrodes and thus between successive discharges, angular mode selection can also occur. If the helical electrode structure and the laser cavity are sufficiently long, the combination of scattering and diffraction losses prevents oscillation in higher order modes while still allowing a single transverse fundamental mode of oscillation. A suitable pitch for the helical electrode structures has been found to be 10° between successive electrodes when utilizing electrode separation of one inch at atmospheric pressure.

A helical laser structure in accordance with the invention has been constructed. A perspective view of this helical laser is shown in FIG. 5. This laser was constructed using 1¾ inch internal diameter lucite tubing 50 connected in 10, 4 foot sections to provide a laser having an overall length of 40 feet. The stabilizing resistors 51 were 1,000 ohms one watt resistors and the laser structure was energized by a 30 KV DC source energizing a 0.16 microfarad capacitor which was discharged through a triggered spark gap (not shown). A typical molecular gas laser mix of 80% helium, 10% $CO_2$, 10% nitrogen at atmospheric pressure was introduced in the laser cavity. A gas input 52 was provided for each 4 foot section and the gas escaped from the laser cavity by a leakage at the joints 53. A fundamental mode output was obtained with a pulse energy of 1 joule and a pulse duration of 300–500 nanoseconds.

FIG. 3 illustrates an electrode structure for an alternative embodiment of the invention. This electrode structure is intended for utilization where a substantial part of a cross section of the laser cavity is to be excited. That is, the electrodes have a substantial width and a greater volume of the laser is thus excited. One of the electrodes as illustrated in FIG. 3 in plan view consists of a plurality of skewed rows of point electrodes which extend along the length of the laser cavity. Successive electrodes in each row are offset laterally from the previous electrode in the same row. All of the electrodes are electrically connected to form one side of a discharge electrode structure which is placed in parallel relation to a flat opposite electrode to provide transverse excitation for the laser cavity. Each of the electrodes 11 in FIG. 3 is connected to a bus bar 14 through a stabilizing resistor 13. As shown in FIG. 4 the electrodes 11 are arranged opposite a common electrode 16 which is illustrated as consisting of a flat plate and a discharge occurs between electrodes 11 and the plate 16. The structure illustrated in FIGS. 3 and 4 when viewed from the end of the laser provides a more uniform decrease in refractive index across the area through which the laser radiation passes and this greater uniformity reduces the average wavefront distortion for each pass in the laser cavity.

The skew angle of the rows of electrodes in the structure of FIGS. 3 and 4 is preferably adjusted so that the lateral displacement between successive electrodes in a row is approximately one-half the width of the electric discharge between an individual pin 11 and the plate 16. Measurements indicate that the width of such a discharge is approximately 2 millimeters.

The embodiments of the invention in which an exclusive property or privilege is claimed are defined as follows:

1. In a molecular gas laser having an optical axis and being energized by a high voltage pulse source, a transverse excitation electrode structure having electrodes on opposing sides of said optical axis and comprising a first series of pin electrodes in said molecular gas and connected to one side of said high voltage pulse source, a second electrode in said molecular gas and positioned transversely in relation to said first series of pin electrodes and the active volume of said laser and connected to the other side of said high voltage pulse source whereby an electrical discharge occurs in said molecular gas between each pin electrode of said first series of pin electrodes and said second electrode, the position of each pin electrode of said first series of pin electrodes being displaced laterally with respect to said optical axis from the position of the immediately adjacent pin electrodes of said first series of pin electrodes, said pin electrodes of said first series of pin electrodes thus forming a row extending at an angle to the optical axis of said laser, to reinforce the generation of laser energy in a predetermined resonant cavity mode.

2. In a molecular gas laser as defined in claim 1, said active volume being circular in cross section, each of said pin electrodes of said first series of pin electrodes being positioned in a pattern of a helix of uniform pitch angle about said active volume, and said second electrode comprises a second series of pin electrodes each positioned diametrically opposite a pin electrode of said first series of pin electrodes.

3. In a molecular gas laser as defined in claim 1, said first series of pin electrodes comprising a plurality of parallel rows of pin electrodes arranged longitudinally of said active volume, and skewed at an angle to the optical axis thereof.

* * * * *